United States Patent [19]

Kennedy

[11] Patent Number: 4,763,877

[45] Date of Patent: Aug. 16, 1988

[54] BUTTERFLY VALVE SEAL ARRANGEMENT

[75] Inventor: Paul G. Kennedy, Horseheads, N.Y.

[73] Assignee: ITT Corporation, New York, N.Y.

[21] Appl. No.: 102,454

[22] Filed: Sep. 29, 1987

[51] Int. Cl.[4] .............................................. F16K 1/22
[52] U.S. Cl. .................................... 251/362; 251/306
[58] Field of Search ................................ 251/362, 306

[56] References Cited

U.S. PATENT DOCUMENTS

| | | | |
|---|---|---|---|
| 1,624,491 | 4/1927 | Hutchinson et al. | 251/306 |
| 3,356,336 | 12/1967 | Maenaka | 251/306 |
| 3,578,288 | 5/1971 | Rishovd | 251/306 |
| 3,721,425 | 3/1973 | Jones et al. | 251/315 |
| 3,726,504 | 4/1973 | Kormos et al. | 251/306 |
| 3,726,505 | 4/1973 | Williams | 251/307 |
| 3,774,880 | 11/1973 | Crookhem et al. | 251/307 |
| 3,814,380 | 6/1974 | Kormos et al. | 251/307 |
| 4,114,856 | 9/1978 | MacAfee et al. | 251/306 |
| 4,281,818 | 8/1981 | Cunningham et al. | 251/307 |
| 4,399,976 | 8/1983 | Legris | 251/306 |
| 4,505,290 | 3/1985 | Scobie | 251/306 |
| 4,560,142 | 12/1985 | Burton | 251/306 |
| 4,575,046 | 3/1986 | Krause et al. | 251/306 |
| 4,593,916 | 6/1986 | Laulhe et al. | 251/306 |
| 4,645,180 | 2/1987 | Bregnow et al. | 251/306 |

Primary Examiner—A. Michael Chambers
Attorney, Agent, or Firm—Menotti J. Lombardi

[57] ABSTRACT

A butterfly valve seal arrangement is described in which an annular rubber seat is inserted in the valve body, and a retaining ring is pressed against the seat and retained in position by a number of J-shaped clips which are inserted in a groove of the valve body at spaced intervals and engage another groove in the retaining ring.

18 Claims, 2 Drawing Sheets

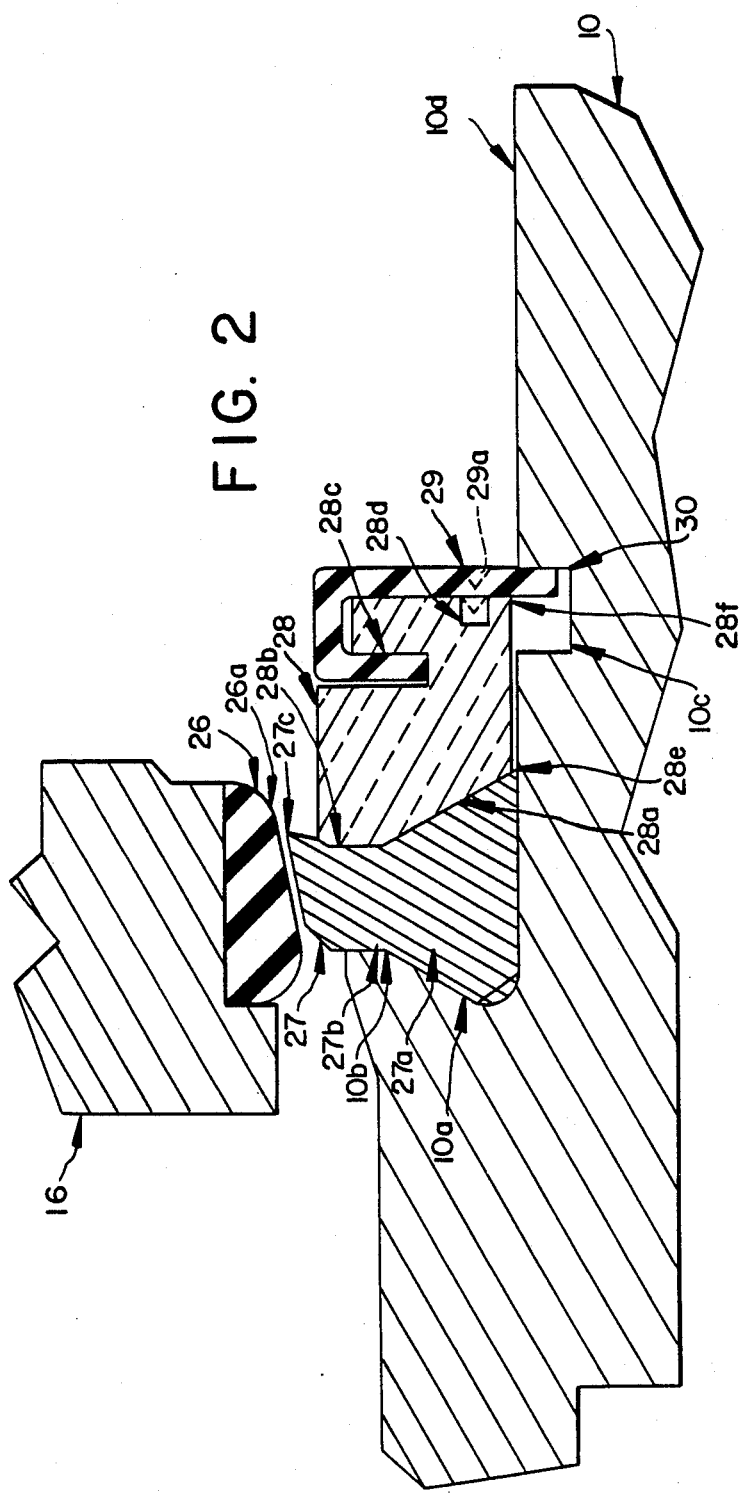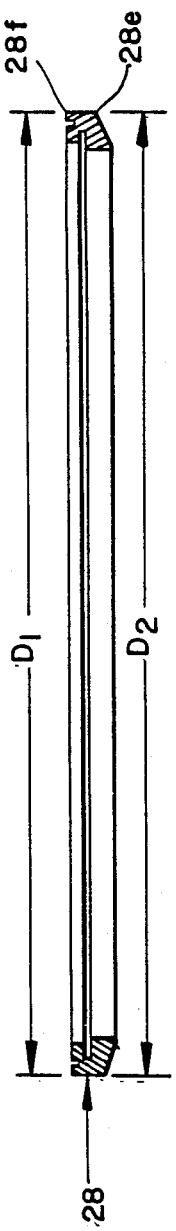

BUTTERFLY VALVE SEAL ARRANGEMENT

BACKGROUND OF THE INVENTION

The invention concerns butterfly valve seals, and more particularly, an improved butterfly valve having a mechanically retained seat.

Butterfly valves have been used for many years for precise flow control in fluid applications. Fluid tight shut-off has been achieved with a rubber or similar type seat in the valve body and a steel ring on the disc. The rubber seat is usually bonded to the valve body or retained by bolts inserted into the body through the seat.

It has been the experience working with such prior art seat arrangements that they require extensive labor to fabricate and assemble. Further, field replacement or adjustment caused problems or were not able to be done. Also, some bonded seats failed under high flow conditions.

In order to overcome the foregoing and other problems with the prior art, an object of the invention is to provide an improved butterfly valve seal arrangement which has a mechanically retained seat, simple to fabricate and assemble, and is field replaceable and adjustable.

SUMMARY OF THE INVENTION

According to the foregoing object and others, the present invention is accomplished by means of an annular rubber seat that is inserted in a complimentary contour of the valve body, and a retaining ring is pressed against the seat and held in position by a number of J-shaped clips which are inserted in a groove in the body at spaced intervals and engage another groove in the retaining ring.

BRIEF DESCRIPTION OF THE DRAWINGS

The invention will become more apparent by reference to the following description taken in conjunction with the drawings, in which:

FIG. 2 is an exploded view of the valve seal arrangement according to the invention; and FIG. 3 is a detail of the retaining ring illustrating a feature of the invention.

DETAILED DESCRIPTION OF THE PREFERRED EMBODIMENT

Figure 1:
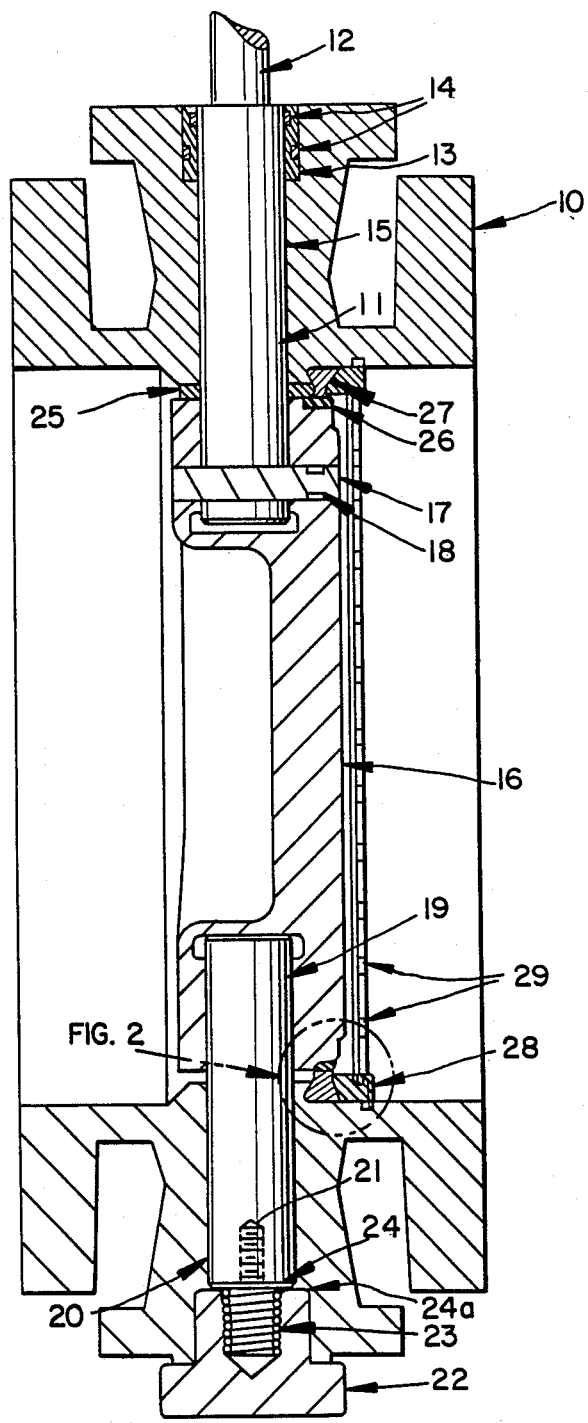
FIG. 1 is a cross-section view of a butterfly valve incorporating the valve seal arrangement according to the invention.

Referring now to FIG. 1, a butterfly valve assembly is illustrated having a cast iron body 10, and an upper rotatable stainless steel shaft 11 with an extension 12 for connecting to a wheel or other turning device in a known manner. The shaft 11 is mounted through a delrin type seal 13 having O-rings 14. A nylon bearing 15 rotatably mounts shaft 11 in body 10. Shaft 11 is coupled to the top portion of ductile iron disc 16 by means of steel disc pin 17 which has an O-ring 18.

A lower rotatable stainless steel shaft 19 is slip fit into the lower portion of disc 16, and rotatably mounted by nylon bearing 20 in body 10. Since the friction is always greater between shaft 19 and disc 16, the shaft will always rotate in bearing 20. Shaft 19 also contains a tapped hole 21 to facilitate removal of shaft 19 from disc 16. End cap 22 contains a spring 23 which acts against a flat nylon bearing 24 positioned between the end of shaft 19 and spring 23. An O-ring 24a is placed between end cap 22 and body 10 for sealing. End cap 22 is bolted or screwed to the body 10 in a known manner.

A nylon spacer disc 25 is positioned around shaft 11 and between the upper part of disc 16 and the upper inside of housing 10. Disc 16 has a stainless steel ring 26 which seals against rubber seat 27. A brass retaining ring 28 is pressed against seat 27 and retained in position by a number of spaced J-shaped clips 29. The invention will be more easily understood if reference is made to FIG. 2 which is a partial enlarged portion of the section shown in FIG. 1.

Referring now to FIG. 2, disc 16 has a stainless steel ring 26 which seals against rubber seat 27. Seat 27 has a wide triangular portion 27a and a narrower neck portion 27b which terminates in a sealing face 27c complimentary to sealing face 26a of ring 26. Body 10 has formed or machined therein a concave contour portion 10a and straight portion 10b complimentary to seat portions 27a and 27b.

Retaining ring 28 which presses against seat 27 also has a complimentary engaging surface with a generally triangular portion 28a and straight portion 28b. Ring 28 contains a first groove 28c for retaining the short leg of the J-shaped clip 29, and a second groove 28d into which the J-shaped clip is deformed 29a to create an interference so that the clip will require considerable force for removal. The long leg of J-shaped clip 29 is inserted into body groove 10c. In the interface 30 of clip 29 and groove 10c, shims may be positioned to allow for field adjustment and further compression of the seat 27. Groove 10c has sufficient width to accomodate shims.

Ring 27 is tapered from point 28e toward point 28f to cause greater interference between body surface 10d and ring 28 in the direction of clip 29. This prestressing of the ring overcomes the rolling effect of the seat 27, since the pressure from the seat 27 is in the direction of clip 29. The tapering of ring 27 from point 28e to 28f can best be understood by reference to FIG. 3 in which the ring is shown with diameters $D_1$ and $D_2$. $D_1$ is greater than diameter $D_2$. For example, with $D_1$ having a dimension of approximately 5 inches, $D_2$ would have a dimension of approximately 0.020 inches less than $D_1$, to provide an acceptable interference fit. For a large ring, such as one with a $D_1$ dimension of approximately 24 inches, $D_2$ would have a dimension of approximately 0.040 inches less than $D_1$ to provide an acceptable interference fit. Dimensions between 4 and 24 inches would be proportionately sized for an acceptable interference fit.

In summary, the butterfly valve seal arrangement described provides an annular rubber seat which is inserted into a dovetail or other complimentary shaped contour in the valve body. A retaining ring is inserted into the body until its leading edge is in contact with the rubber seat, and the trailing edge of the retaining ring is not quite past a circumferential groove in the valve body. Additional force is then applied to the retaining ring which causes it to compress the rubber seat exposing the groove and permits stainless steel clips, substantially J-shaped in cross-section, to be inserted so that the long end extends into valve body groove and the short end extends into another groove formed in the retaining ring.

Typically, the number of clips is about equal to the ring size in inches, with a minimum number of three. When the additional force is removed, the rubber seat tends to move to a less compressed condition and the movement is restrained by the shear stress in the clip. The degree of compression of the rubber seat is governed by the amount of spring-back allowed and can be controlled by shimming behind the long end of the J-shaped clip. To prevent the clips from moving out of the valve body groove, a prick punch on the clip causes the clip material to deform into an additional groove in the retaining ring.

An additional feature of the invention is making the fit between the valve body and retaining ring into a slight interference fit by tapering the ring surface in contact with valve body to prestress the ring. When the ring is inserted into the body, the taper and the interference cause it to move into the rubber seat which offsets the tendency of the compressed rubber seat to move to a less compressed condition.

While the present invention has been disclosed in connection with the preferred embodiment thereof, it should be understood that there may be other embodiments which fall within the spirit and scope of the invention as defined by the following claims.

What is claimed is:

1. A valve seal arrangement comprising:
    a valve body;
    a disc rotatably mounted in said valve body, said disc having a disc ring mounted thereon to form a sealing surface;
    an annular rubber seat with a sealing face inserted into said body and said sealing face positioned opposite said sealing surface;
    a retaining ring pressed against said seat and positioned below said sealing face; and
    at least three clip means inserted in a groove formed in said retaining ring, whereby said retaining ring maintains compression on said seat.

2. The arrangement according to claim 1, wherein said clip means is substantially J-shaped such that its long end is inserted in said groove and its short end is inserted in said other groove.

3. The arrangement according to claim 2, where said long end of said J-shaped clip is deformed to create an interference with an additional groove formed in said retaining ring.

4. The arrangement according to claim 3 including shims inserted between said long end of said J-shaped clip and said groove to effect greater compression of said seat.

5. The arrangement according to claim 1, wherein said ring surface in contact with said valve body is tapered to form an interference fit.

6. Valve apparatus comprising:
    a valve body having a circumferential groove formed therein adjacent and perpendicular to the valve flow path;
    a disc rotatably mounted in said body and moveable to open and close the valve flow path;
    a disc ring mounted on said disc to form a sealing surface when said disc is in a closed position;
    an annular rubber seat inserted in a dovetail groove in said body parallel to said circumferential groove, having a sealing face and forming a seal with said disc ring when said disc is in a closed position;
    a retaining ring pressed against said seat and positioned below said sealing face and adjacent said circumferential groove, said retaining ring having first and second grooves formed thereon; and
    a multiplicity of substantially J-shaped clips at spaced intervals along said retaining ring, said clips having the long ends inserted in said circumferential groove and the short ends inserted in said retaining ring first groove, whereby said retaining ring restrains said seat from movement.

7. The valve apparatus of claim 6, wherein the long end of said clip are deformed to create an interference with said second groove in said retaining ring.

8. The valve apparatus of claim 7, wherein said retaining ring surface in contact with said valve body is tapered to form an interference fit.

9. The valve apparatus of claim 6, including shim means inserted between the long ends of said clips and said circumferential groove in a position to force greater compression on said seat.

10. In a butterfly valve, a seal arrangement comprising in combination:
    a valve body;
    shaft means rotatably mounted in said valve body;
    a disc mounted on said shaft means, said disc having a disc ring mounted thereon to form a sealing surface;
    an annular rubber seat positioned in said body, said seat having a sealing face positioned opposite said sealing surface;
    a retaining ring pressed against said seat and positioned below said sealing face; and
    at least three clip means inserted in a groove formed in said valve body at spaced intervals and engaged in another groove in said retaining ring, whereby said retaining ring maintains compression on said seat.

11. The arrangement according to claim 10, wherein said clip means is substantially J-shaped so that its long end is inserted in said groove and its short end is inserted in said other groove.

12. The arrangement according to claim 11, where said long end of said J-shaped clip is deformed to create an interference with an additional groove formed in said retaining ring.

13. The arrangement according to claim 12 including shimming means inserted between said long end of said J-shaped clip and said groove to effect greater compression of said seat.

14. The arrangement according to claim 13, wherein said retaining ring surface in contact with said valve body is tapered to form an interference fit.

15. Apparatus comprising in combination:
    a valve body having a circumferential groove formed therein adjacent and perpendicular to the valve flow path;
    a disc and shaft arrangement rotatably mounted in said body and moveable to open and close the valve flow path;
    a disc ring mounted on said disc to form a sealing surface when said disc is moved to a closed position;
    a rubber seat inserted in a dovetail groove in said body parallel to said circumferential groove, said seat having a sealing face to form a seal with said disc ring when said disc is in a closed position;
    a retaining ring mounted against said seat and positioned below said sealing face and adjacent said circumferential groove, said retaining ring having first and second grooves formed therein; and
    a multiplicity of substantially J-shaped clips at spaced intervals along said retaining ring, said clips having the long ends inserted in said circumferential groove and the short ends inserted in said first groove in said retaining ring, whereby said retaining ring restrains said seat from movement.

16. The apparatus of claim 15, wherein the long ends of said clips are deformed to create an interference with said second groove in said retaining ring.

17. The apparatus of claim 15, wherein said retaining ring surface in contact with said valve body is tapered to form an interference fit.

18. The apparatus of claim 15, including shim means inserted between the long ends of said clips and said circumferential groove in a position to force greater compression on said seat.

* * * * *